Nov. 11, 1952

J. M. SANCHEZ-PEREZ 2,617,944

SERIAL ROENTGENOGRAPHY

Filed Feb. 19, 1949

5 Sheets-Sheet 1

INVENTOR.
JESUS M. SANCHEZ-PEREZ,
BY
Edwin D. Jones
ATTORNEY.

INVENTOR.
JESUS M. SANCHEZ-PEREZ,
BY
Edwin D. Jones
ATTORNEY.

INVENTOR.
JESUS M. SANCHEZ-PEREZ,
BY
Edwin D. Jones
ATTORNEY.

Nov. 11, 1952 J. M. SANCHEZ-PEREZ 2,617,944

SERIAL ROENTGENOGRAPHY

Filed Feb. 19, 1949

5 Sheets-Sheet 4

INVENTOR.
JESUS M. SANCHEZ-PEREZ,
BY
Edwin D. Sauer
ATTORNEY.

INVENTOR.
JESUS M. SANCHEZ-PEREZ,
BY
Edwin D. [signature]
ATTORNEY.

Patented Nov. 11, 1952

2,617,944

UNITED STATES PATENT OFFICE 2,617,944

SERIAL ROENTGENOGRAPHY

Jesus M. Sanchez-Perez, Beverly Hills, Calif., assignor of one-tenth to Miriam I. Sanchez-Perez, Beverly Hills, Calif.

Application February 19, 1949, Serial No. 77,406

12 Claims. (Cl. 250—66)

This invention relates to photoroentgenography and particularly to means for automatically taking a series of X-ray photographs in timed relation to one another with the general object of visualizing the characteristics of the vascular system of the human body. The machine in which the features of the invention are incorporated is particularly intended to secure X-ray photographs of the progress of a column of opaque media through the circulatory system of various organs and parts of the human body thus enabling diagnosis to be made of the probable cause, and aiding in the location of the cause, of irregularity in the circulation of the opaque medium in the patient, as compared with the characteristic circulation through the same portions of the body of an individual in good health.

The machine has at present been found most useful in the investigation of the human brain, heart and kidneys but it may of course be also used in the investigation of causes giving rise to deficient circulation of other parts and organs of the body such as in the hands and feet, or in researches on animals.

It will be evident that in order to obtain reliable results from the procedure outlined it is essential that accuracy in the timing of the X-ray photographs should be provided for as well as automatic means for positioning and removing the cassettes containing the X-ray plates or film since in many important applications a plurality of photographs must be secured in a few seconds. A further important requirement is that the intervals at which photographs are taken should be capable of adjustment within comparatively wide limits, and regularity.

It is an important object of the invention to provide a machine for taking a plurality of X-ray photographs at timed intervals incorporating a single driving element effective to positively operate a plurality of mechanisms by which the X-ray machine is controlled, the cassettes manipulated, and the machine switched off, all in timed sequence, without requiring the operator to do more than start the machine.

Another object of the invention is to provide a machine having the features above referred to and in which the intervals at which the X-ray photographs are taken may be adjusted to suit the particular requirements of the case to be studied. A further object of the invention is to provide a machine of the kind described which is simple yet accurate in performance.

A still further object of the invention is to provide a machine for taking a plurality of X-ray photographs at predetermined intervals fitted with means for automatically removing and temporarily storing exposed cassettes.

Another object of the invention is to provide a machine of the kind described which is fitted with a starting system arranged to prevent the accidental setting into operation of the machine.

Still further objects and features of the invention will hereinafter appear from the following specification taken in conjunction with the accompanying drawings illustrating embodiments of the invention at present deemed preferable but it is to be understood that various changes, rearrangements and modifications of parts may be made by those skilled in the art without departing from the scope of the invention as intended to be defined by the appended claims.

Figures 1, 2:
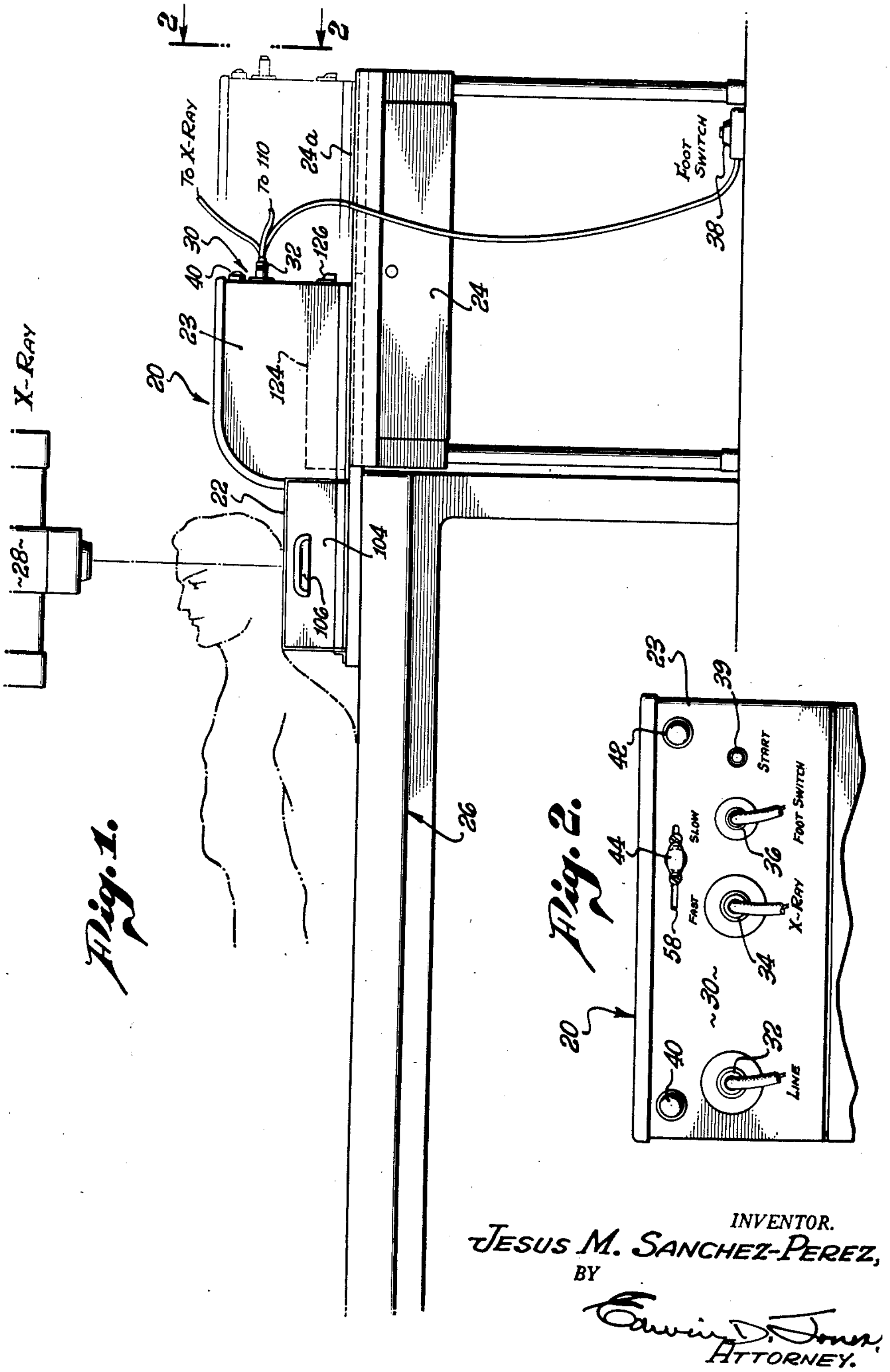
Fig. 1 is a view showing the machine in side elevation and in position for operation with respect to the brain of a subject to be photographed.
Fig. 2 is a detail view looking in the direction of the arrows 2—2, in Fig. 1, drawn on a larger scale and showing the control panel of the machine.
Figure 3:
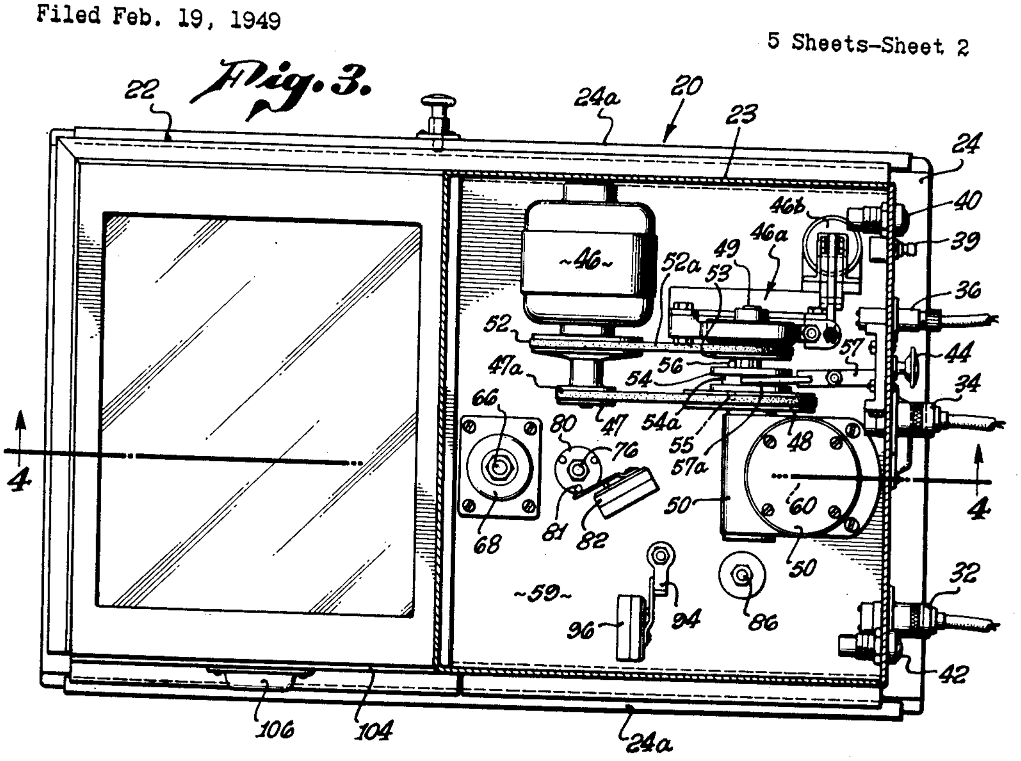
Fig. 3 is a plan view of the machine, with a housing cover removed to show mechanism mounted therein.

In the drawings the numeral 20 in Fig. 1 indicates the machine of the invention in use. In view of the characteristic novel function of the machine it will hereinafter be referred to as the seriograph. The seriograph includes a housing 22 containing the plates or films on which the photographs are to be taken, projecting forwardly from, but integral with, a housing 23 adapted to contain exposed plates or films and the operating mechanism of the seriograph, which mechanism is electrically driven.

The seriograph is preferably slidably mounted on a table or small stand 24 of such a height that the forward portion may be slid on the stand on guides 24a to bring the unexposed plate housing over the end of an X-ray diagnostic table 26 so that housing 22 may be comfortably used to support the head of a patient under the X-ray tube 28 to enable X-ray photographs of his brain to be made. It is to be understood that the described arrangement of parts may be varied to suit the particular part of the body of which the X-ray photographs are to be taken, the arrangement shown being suitable for taking X-ray photographs of the heart and other organs of the body, as well as of the brain.

In Fig. 2 the control panel 30 is shown fitted with plug connectors 32 for a cable plugged into the usual A.-C. line, 34 for a cable connected to the X-ray timer, 36 for a cable connected to a foot switch 38, and a push switch 39 for starting the motor. The control panel also is fitted with a green panel signal light 40 and a red signal light 42 the purpose of which will be later explained, and with a speed control knob 44 also later referred to.

The driving mechanism for the seriograph comprises a motor 46 fitted with any suitable brake 46a arranged to be held off by a solenoid 46b while the motor is running and with a two speed belt and pulley drive, pulleys 47 on the motor shaft and 48 on the drive shaft 49 of speed reducer gearbox 50 giving low speed, while pulleys 52 on the motor shaft and 53 on the drive shaft of the speed reducer gearbox gives high speed. The pulleys are connected by belts 47a and 52a of the usual type. Pulleys 48 and 53 are freely rotatable on shaft 49 but either pulley 48 or 53 may be connected to the gearbox drive shaft 49 by coupling member 54 slidably mounted on shaft 49 but splined thereto to rotate with said shaft. Pins 55, 56 are set in coupling member 54 to project from opposite faces thereof and may be brought into driving engagement with pulley 48 or 53 by sliding member 54 along shaft 49 by pivoted lever 57, the forked end 57a of which engages a groove 54a in the periphery of member 54. Lever 57 is actuated by knob 44 mounted on the forward end thereof which slides in a slot 58 provided in the panel 30.

A horizontal partition 59 is arranged to extend across housing 23 on which the mechanism described is mounted. A driven shaft 60 (Figs. 6 and 7) extends downwardly from the gear box 50 to below partition 59 and a chain sprocket 62 is secured on the shaft. A second chain sprocket 64 is secured to a vertical shaft 66 mounted in bearings 68 carried on partition 59 toward the side opposite to shaft 60. A driving chain 70 is mounted on the sprockets 62 and 64 and kept tight thereon by any suitable well known means (not shown).

A pin 72 is mounted to extend upwardly from the chain 70, and at each revolution of the chain engages a different arm of a six-armed star wheel 74 in the described embodiment mounted on a vertical shaft 76 carried in a bearing 78 mounted on the lower face of partition 59. Shaft 76 extends above the partition and a contact disc 80 is mounted thereon from which three pins 82 extend. Shaft 76 is carried in the bearing 78 to be held against longitudinal movement therein in any suitable manner.

A double acting microswitch 82 is arranged so that one contact of the switch 82 is closed as each pin in turn is brought into engagement with the lever of the switch, while the other contact is closed as the lever is released. Closing of the contacts of microswitch 82 operates to complete an electrical circuit effective to cause the X-ray machine to take a photograph on an X-ray film positioned in housing 22, each X-ray negative exposed being automatically removed before the next operation of the X-ray machine as will be later explained.

A second six-armed star wheel 84 is secured on a vertical shaft 86 mounted on the partition 59 in position to have its arms engaged in succession by pin 72. A pin 88 is mounted on one arm of the star wheel 84. It will be evident that star wheel 84 will be turned one-sixth of a revolution for each revolution of the chain 70.

A switch off and locking lever 90 is pivoted to the lower face of the partition on a vertical shaft 92 with sufficient friction to remain in positions to which it is moved. One end of the lever 90 projects into the path of pin 88 while the other arm is sufficiently long to project into the path of the pin 72 projecting upwardly from driving chain 70 when lever 90 is moved out of its normal position, shown in dotted lines in Fig. 6, and moved by pin 88 on star wheel 84 into the full line position shown in Fig. 6. A stop 93 mounted on partition 59 limits the movement of lever 90 by pin 88.

A switch operating arm 94 is mounted on lever 90 and is effective, when lever 90 is swung about its pivot, to open a normally closed switch 96 in the motor circuit and interrupt the motor circuit.

Figures 14, 15, 16:
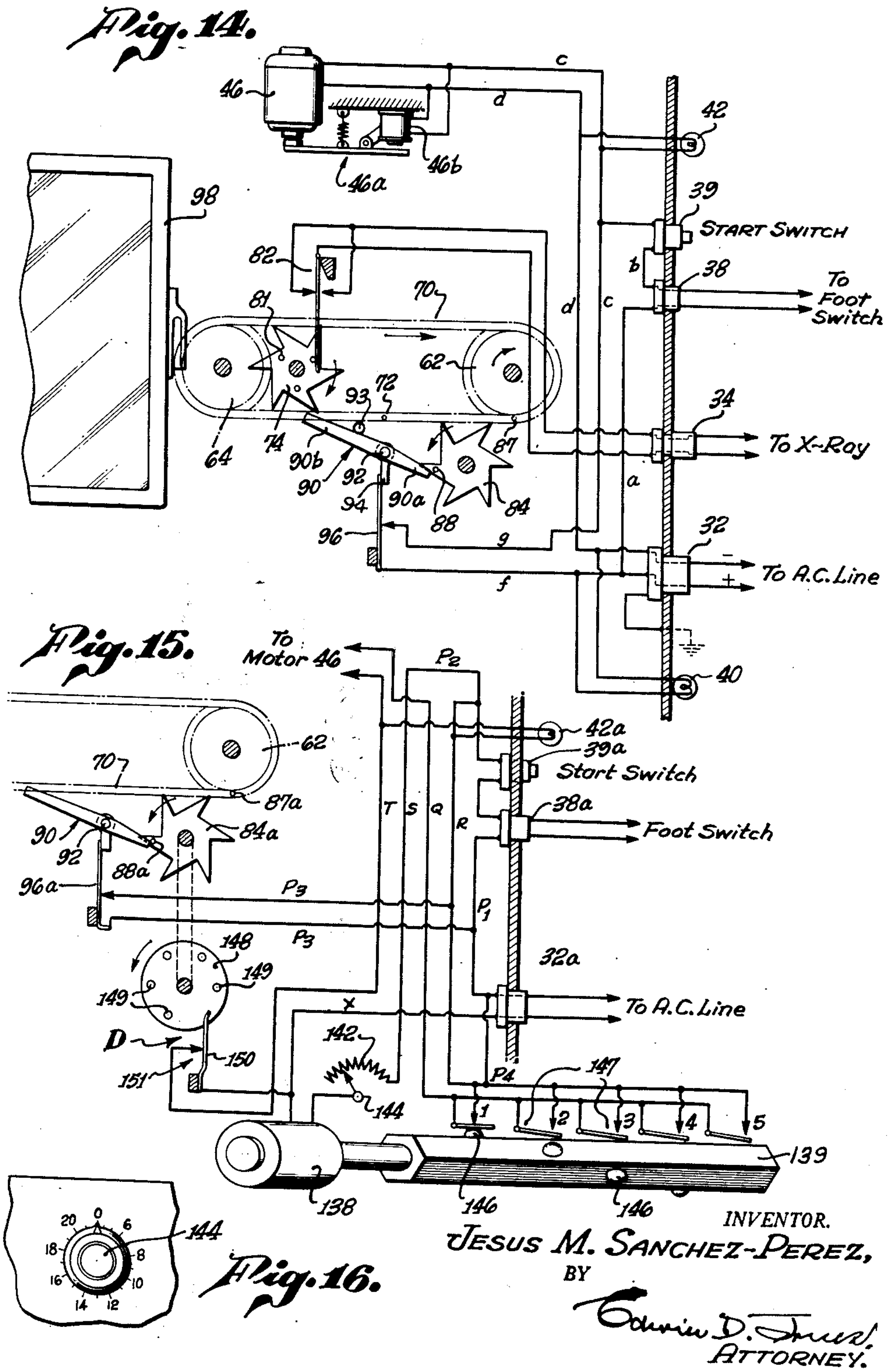
Fig. 14 is a schematic wiring diagram of the machine.
Fig. 15 is a schematic diagram showing the wiring for a modified form of the machine arranged to obtain a series of X-ray photographs taken at regular intervals during periods additional to those for which the machine normally is arranged.
Fig. 16 is a face view of an additional dial fitted in the control panel when the circuit of Fig. 15 is utilized in the machine.

As shown in the circuit diagram of Fig. 14, the foot switch 38 and start switch are connected in series, by a lead in parallel to the motor circuit. Both switches are of the push type, the contacts being closed while pressure is maintained on the switch, but opened to interrupt the starting circuit when pressure is removed. It is to be remembered that when the series of six X ray photographs have been taken, switch 96 in the motor circuit is opened and will remain open until the motor is restarted, whereupon pin 72 in moving forward will strike the end of lever 90, thus enabling switch 96 to close and completing the motor circuit. After the motor has been stopped therefore, it can be restarted by momentarily applying pressure to both switches 38 and 39 after which the motor will continue to operate although the switches are released until switch 96 is again opened.

Panel light 40 is red in color and is directly connected across the 110 volt A.-C. line so that the light is on whenever the machine is plugged into the A.-C. line. Panel light 42 is green in color and is connected across the motor circuit so that this light is not put on until the motor circuit is completed and the seriograph is in condition to operate in timed relation to the X ray machine.

It will be understood that the X ray machine itself is of standard construction, its controls, other than the timed supply of operating voltage, being independent of the machine.

The seriograph is arranged to automatically position unexposed films and withdraw exposed X ray film by the following mechanism.

The cassettes, as shown in Figs. 9 through 13 are formed as rectangular frames 98 having held therein an upper layer formed of a sheet of Bakelite and an intensifier screen cemented to the Bakelite in any suitable manner, and a lower layer formed of a lower intensifier screen, a sheet of felt, a sheet of lead and a bottom sheet of aluminum, the lower layer also being cemented together. The X ray film is positioned between the upper and lower layers. The inner edges of the frame members are grooved at 98*a* to receive the sheet of Bakelite and intensifier screen, and the lower inner edge of the back member 98*b* of the frame is provided with a forwardly projecting lip 98*c* which supports the rear edge of the X ray film and of the lower layer, the front edges of the film and lower layer being held against the Bakelite plate by a pair of metal clips 100 slidably mounted in slots in the upper and lower surface of the front member 98*d* of the frame and limited in their sliding movement by a pin 100*a* projecting from the front member into a slot in the clip. By the described construction film may be withdrawn from the cassette very easily and quickly by pulling the clips forward to free the front edge of the lower layer which then may be opened away from the upper layer and the film withdrawn from between the upper and lower layers.

It is believed that the manner of loading the cassettes will be obvious. The front member 98*a* of the cassette is provided with a troughlike withdrawing member 102 having an open end 102*a*, the length of member 102 being sufficient to enable the pin 87 projecting downwardly from chain 70 to enter the open end and move into it a distance equal to the radial distance of the pin 87 from the center of sprocket wheel 64 in order that the pin 87 may operate to pull the top cassette out of housing 22 after each photograph has been taken. The housing 22 is fitted with a drawer 104 furnished with a draw pull 106. The drawer snugly fits the cassettes, the side of the drawer toward housing 23 being cut away, as indicated at 104*a* to permit the cassette withdrawal members 102 to project therethrough into a position such that the top cassette will be engaged and withdrawn by pin 87.

The stack of six cassettes in the described embodiment is carried on a rising bottom plate 108 mounted at front and back on a pair of levers 110, 111 pivoted at their centers on the downturned ends of a length of channel iron 112 by pivot studs 114. The lower end of bars 111 are pivoted to brackets 116 secured to the bottom of the drawer and the lower ends of bars 110 are mounted to slide in horizontal slots 118 formed in upstanding brackets 119 also secured to the bottom of the drawer.

Springs 120 are arranged under compression between member 112 and the bottom of the drawer thus forcing the upper ends of levers 110, 111 against the rising bottom 108. To reduce friction between the upper ends of the levers and rising bottom 108, rollers 122 are mounted at the upper ends of the arms and engage the underside of rising bottom 108.

Figure 4:
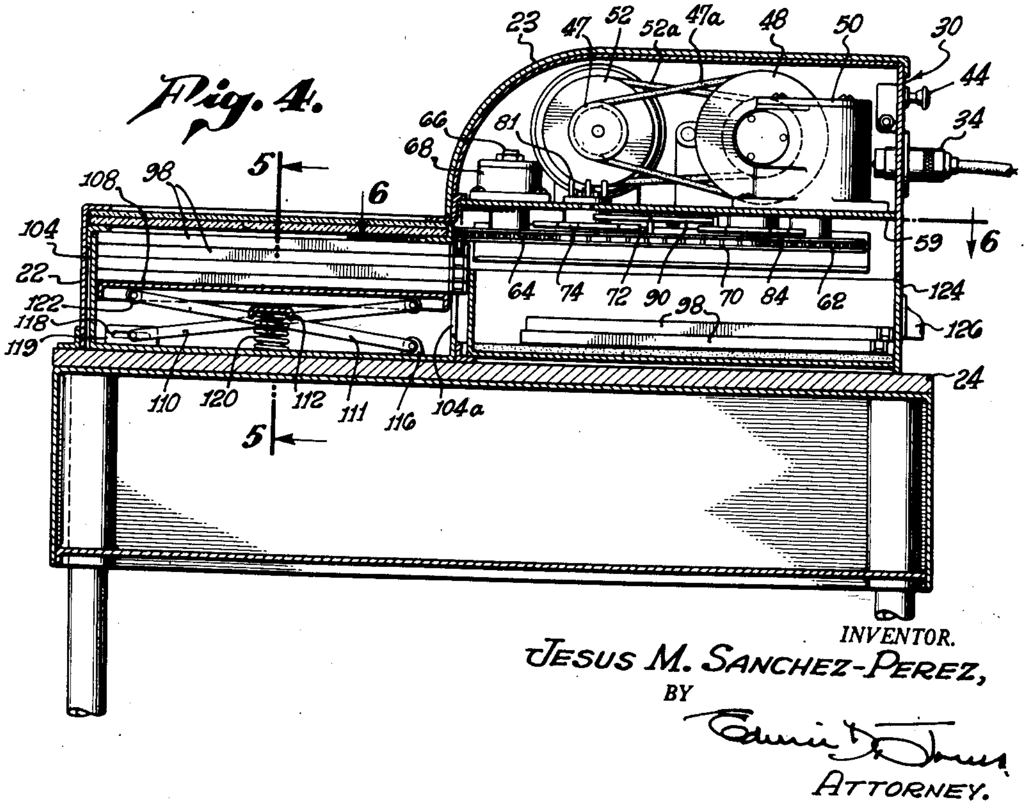
Fig. 4 is a section on the line 4—4 of Fig. 3.
Figure 5:
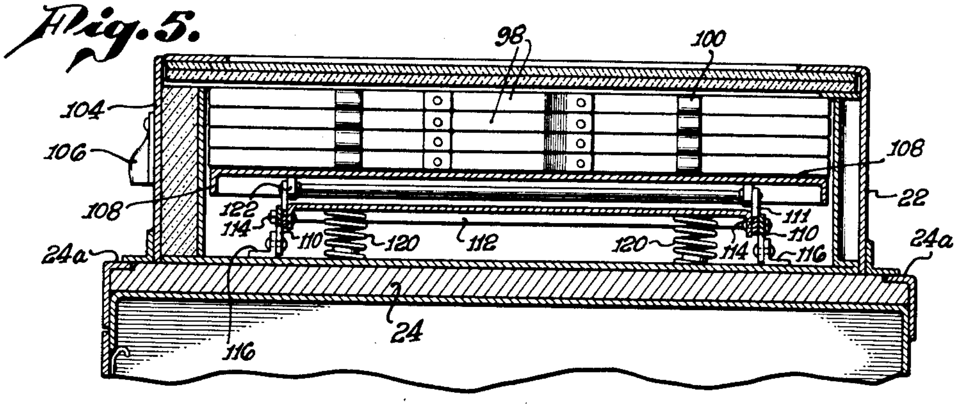
Fig. 5 is a section on the line 5—5 of Fig. 4.
Figure 6:
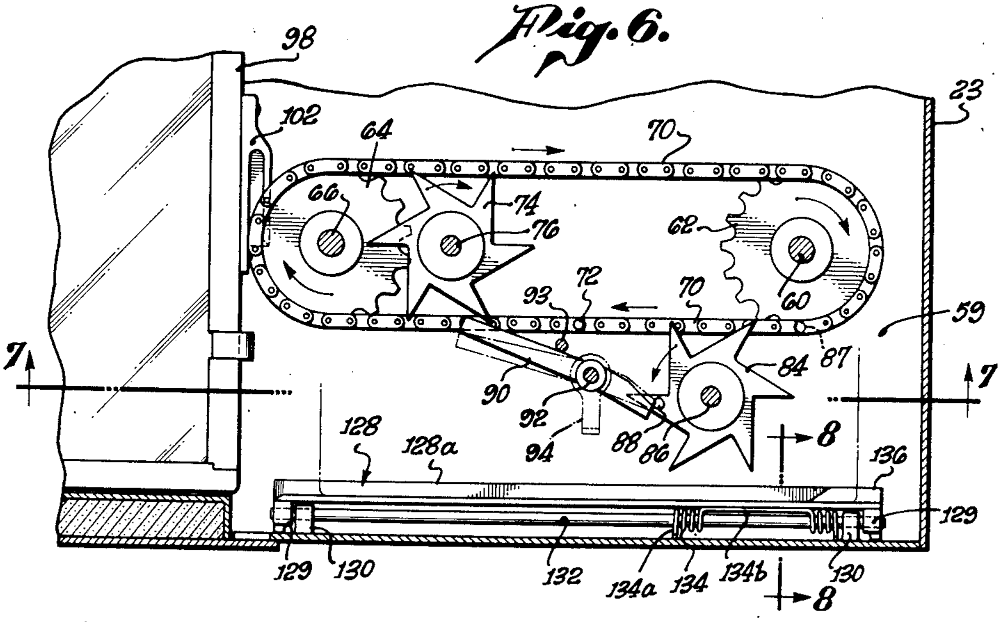
Fig. 6 is a fragmentary section on the line 6—6 of Fig. 4.
Figures 7, 8:
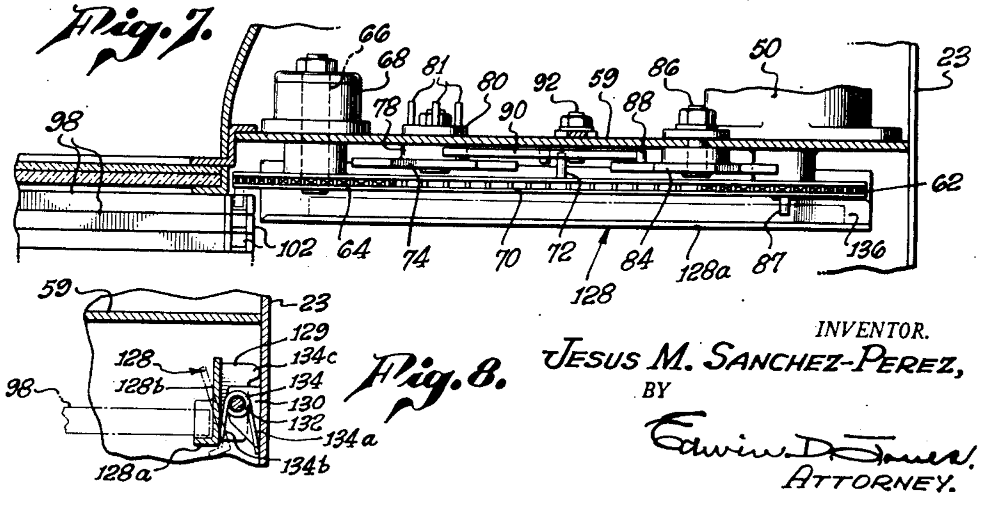
Fig. 7 is a section on the line 7—7 of Fig. 6.
Fig. 8 is a fragmentary detail in section on the line 8—8 of Fig. 6.
Figure 9:
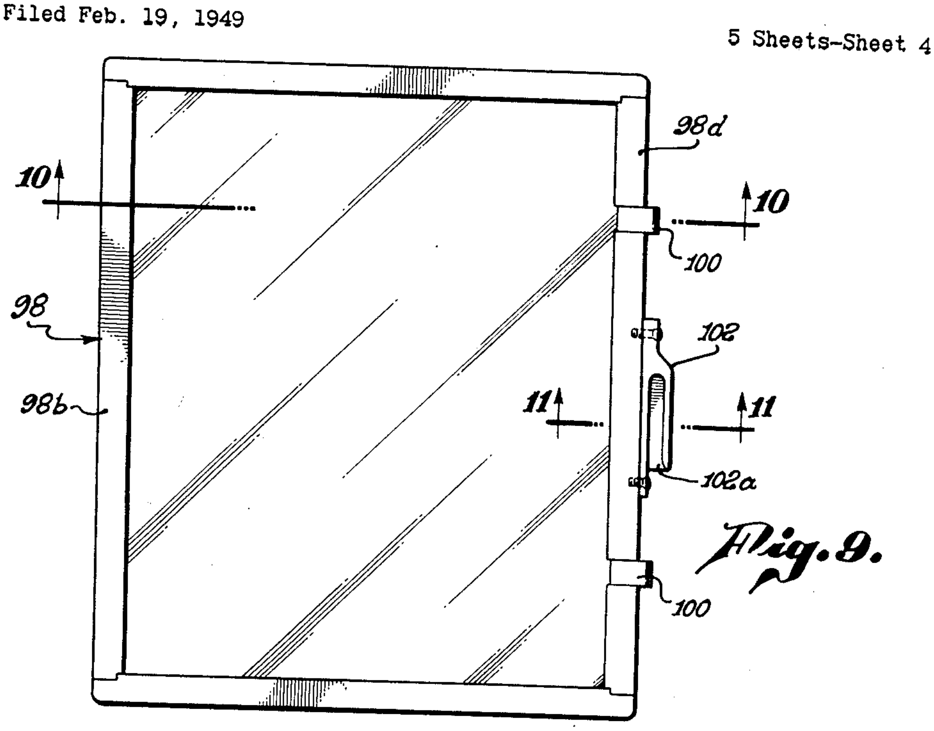
Fig. 9 is a plan view of a holder or cassette for X-ray film, several of which are utilized in the machine.
Figure 10:
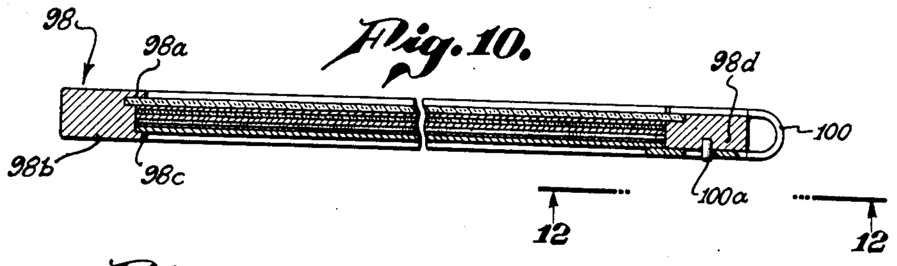
Fig. 10 is a section on the line 10—10 of Fig. 9, drawn on a larger scale.
Figure 11:
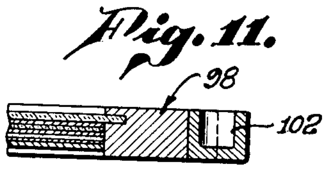
Fig. 11 is a fragmentary detail in section on the line 11—11 of Fig. 9, drawn on a larger scale.
Figure 12:
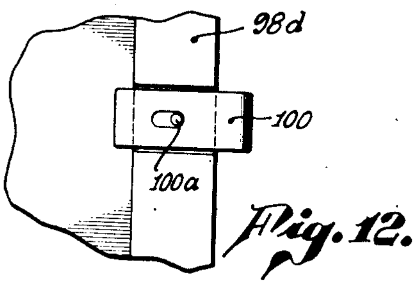
Fig. 12 is a fragmentary detail view taken on the line 12—12 of Fig. 10.
Figure 13:
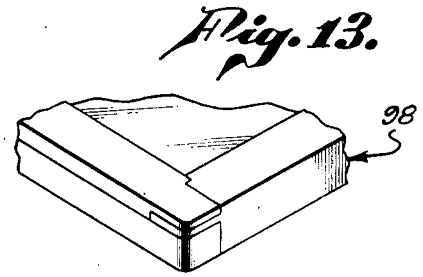
Fig. 13 is a fragmentary detail showing the corner joint construction of the element shown in Fig. 9.

The engagement of pin 87 with the withdrawal member 102 of the cassette raised into engagement with the underside of the top of housing 22 is clearly shown in Figs. 4 and 6. It will be evident that, as pin 87 is carried round with the movement of chain 70 in the direction of the arrow in Fig. 6, the top cassette will be pulled into housing 23 until pin 87 again moves out of engagement with member 102 of the cassette. In order to insure that the cassette is moved fully into housing 23 in engagement with pin 87 until in position to be dropped into a rubber lined drawer 124 in the lower portion of housing, and fitted with a drawer pull 126, a pair of longitudinally extending guides 128 are tiltably mounted on opposite sides of the housing 23 in position to receive the cassettes (see Figs. 6, 7, and 8).

The guides 128 are L-shaped in cross section and the vertical portion is provided at each end with outwardly extending ears 129, the horizontal portion 128*a* of the guides extending inwardly and engaging under the cassettes.

Inwardly extending lugs 130 are mounted in position on the inner face of the housing 23 to overlap the ears 129, and a pivot rod 132 is passed through aligned holes drilled through the lugs 130 and ears 129 thus mounting the guides for tilting movement about rod 132. In order to hold the guides in operative position (see Figs. 6 and 8) a helical spring 134 is provided, with its ends formed as legs 134*a* bearing against the inside of the housing and a center portion of the spring looped to provide a portion 134*b*, bearing against the vertical side 128*b* of the guide along a line below the pivot rod. Spring 134 is mounted in stressed condition.

Projections 134*c* at the upper ends of ears 129 act to limit upward rotation of the horizontal portions of the guides so that they are resiliently held in proper position. The guides are tilted about rod 132 thus swinging the horizontal portion downwardly into the dotted line position shown in Fig. 8.

When a cassette has been drawn fully into housing 23 and while pin 87 is travelling freely in the slot in member 102 the guides are opened by inwardly sloped cam surfaces 136 on the vertical faces of the guides, which surfaces are engaged by the forward edges of the cassettes toward the end of travel of pin 87 in direction to pull the cassettes into the housing 23. As the horizontal edges 128*a* of the guides are swung downwardly and outwardly from under the edges of the cassettes the latter drop onto the bottom of drawer 124.

While the two speed mechanisms described have been found very valuable for visualization of the characteristics of the vascular system of the brain and heart by serial roentgenography it may be required to provide a greater range of speeds providing greater intervals of tone between the taking of each X ray photograph. A suitable circuit for such a modification of the machine is shown in Fig. 15, an additional dial mounted on the control panel to control additional elements of this circuit being shown in Fig. 16. In Fig. 15, 138 indicates a small motor driving a rotatable multiswitch 139. The motor is preferably furnished with a brake effective to stop the motor, and therefore the rotation of the multiswitch, immediately the operating circuit of motor 138 is interrupted.

Motor 138 is supplied with operating voltage through a variable resistance 142 controlled by a knob 144 on the control panel as shown in Fig. 16, since the load on the motor is constant this method of varying the speed of the motor is satisfactory in use. Switch 139 may be formed, in the particular embodiment of the invention described, as a hexagonal member of insulating material having a series of five projections 146 arranged on consecutive faces and spaced from each other along a helical line. Each projection is effective to close one of a bank of normally open switch switches 147 connected in the circuit of motor 46 and therefore switch 139 is effective to set motor 46 into operation. The duration of time motor 46 continues to run is controlled by a disc interrupter switch D comprising a disc 148 mounted to be rotated synchronously with starwheel 84*a*.

Disc 148 is fitted with 5 pins 149 effective to interrupt the circuit of motor 46 after a predetermined interval by engagement with the arm 150 of normally closed switch 151, the sixth and last interruption of the operation of motor 46 being effected by the opening of switch 96*a* by pin 88*a* on starwheel 84*a*. Switch 96*a* also interrupts the circuit of motor 138 thus bringing the whole machine to rest at the end of the cycle.

The exposed cassettes are removed from drawer 124, unexposed cassettes loaded into drawer 104 and the machine is then ready to again go through the full cycle outlined.

It should be noted that while a series of six photographs equally spaced in time and all taken with the period taken by the column of opaque fluid to flow through the portion of the vascular system under study has been particularly described, the machine may be readily adapted to take any required number of photographs in any required time by fitting the electrical circuit with the components required.

The circuit and component mechanisms shown in Fig. 15 may be readily substituted in the machine embodying the invention, or fitted in addition to the circuit and mechanism shown in Fig. 16 with switch means enabling either circuit to be used. However it is considered desirable, in view of the advance in technique provided by this invention, that practitioners should gain experience with the two speed machine first described, which is well suited to a large number of applications, before undertaking to use the somewhat more complicated machine having the circuit shown in Fig. 15.

The operation of the seriograph will be described with reference to the study of the functioning of the vascular system of the brain of a patient by way of example only, since as before stated the machine embodying the invention may also be used for studying the functioning of the vascular system of other parts of the body, or for animal experimentation.

The patient is first placed on the X ray table with his head resting on the part 22 of the housing and a carefully measured amount of opaque fluid is injected into the internal carotid artery or the common carotid artery or into the major artery of the organ to be explored. The amount and nature of the fluid need not here be discussed since the operation of the seriograph is not affected thereby but it is essential that the time taken by the injected quantity of the opaque liquid to traverse the vascular system of a healthy brain should be known, in the example described it will be taken to be four and one half seconds. Six photographs taken at intervals of seven-tenths of one second will give a clear visualization of the vascular system of the subject's brain.

It is assumed that six cassettes holding unexposed X ray film have been loaded into the drawer in part 22 of the housing and that all necessary adjustments of the X ray machine have been made. At the instant of the injection of the opaque fluid the operator pushes the start switch 39 and foot switch 38, the green panel light 42 will be illuminated and the X ray machine put into operation. The switch 96 will be in open position after the termination of the previous cycle of operation of the machine but the closing of both start and foot switches will complete a circuit independent of switch 96 through leads *a*, *b*, *c*, to the motor and its brake take-off solenoid, the circuit being completed through leads *d* and *e* to the line. The motor will immediately rotate, driving sprocket 62 in the direction of the arrow (Fig. 14) and therefore moving the belt 70 mounted on the sprockets 62, 64 in the direction of the arrow, carrying pin 72 forwardly against lever 90 and rocking it about its pivot 92, thereby moving arm 93 on lever 90 away from normally closed switch 96 and enabling it to close, thus completing a circuit through leads *f*, *g* to *c* bypassing the "start" and footswitches, which may be released. Green panel light as connected across *c*, *d* will now light.

The motor will now continue to run, pin 72 turning star wheel by engaging a successive arm thereof at each revolution. Each movement of the starwheel 64 is transmitted through pins 64 to double acting switch 82 controlling the X ray machine timer (not shown) and effecting the taking of six X ray photographs at exactly timed intervals. It will be noted that pin 72 projects upwardly and leads pin 87, which projects downwardly. Pin 87, shortly after pin 72 has caused the taking of one X ray photograph, will be carried into the withdrawing member 102 of the top cassett containing the exposed film and will pull it into part 23 of the housing along the guiding members 128 and will bring the cassette fully into the housing well before pin 72 again operates the X ray machine. The cassettes in the fully retracted position engage the cam surfaces on the guides forcing them outwardly, and drop freely into the rubber lined drawer 124 in the bottom of the housing 23.

The simplicity and accuracy in functioning of the elements referred to should be noted and, in consequence, there cannot be any faulty timing in the cooperation of the parts once the initial adjustments have been made since the parts are operated by the pins permanently fixed on the single driving member, which is the chain 70. Pin 72 also operates to switch off the seriograph after six photographs have been taken since it turns star wheel 84 one sixth of a revolution each time the pin engages the star wheel, the sixth engagement of the pin with the star wheel will carry pin 88 on the starwheel against the head 90*a* of switch lever 90 and cause it to interrupt the motor circuit. As the motor is stopped immediately the brake solenoid is deenergized by interruption of the motor circuit, the pin 72 is stopped before reaching the tail 90*b* of the switch lever 90, thus the switch will remain open until both the "start" and footswitches are depressed together which is very unlikely to occur by accident so that the seriograph may be considered safe against accidental operation.

It should be noted that by the automatic positioning and removal of the cassettes the amount of time the operator spends in proximity to the patient, that is, in the area in which exposure to X radiation is most dangerous, is very largely reduced as compared to machines in which the cassettes are manually positioned and removed.

In the operation of the circuit shown in Fig. 15 and before the seriograph is put into operation, switch 96*a* and the start switches are open, but switch D is closed because there is no sixth pin on disc 148 to open the switch. When the operator closes both the start switches he establishes a circuit to motor 138 from the line through leads P1, P2, rheostat 142 and back to the line. Motor 138 closes contact #1, which completes a circuit for motor 46 from line through P1, R, contact #1, Q to the motor and return through T, closed switch D, to the line. Rotation of motor 46 enables switch 96*a* to close after which the starting switches may be released, a circuit being provided through P1, P3, switch 96*a*, R, P2, rheostat 142 to line for motor 138 and for motor 46 from line through P4, #2 contact, Q to motor 46 through T, disc switch D to *x*, until switch D is opened by a pin 149 on disc 148, until circuit is reestablished through contact #3 and later broken by switch D and so on until switch 96 opens, at the end of the cycle bringing the seriograph to a stop.

It will be particularly noted that the automatic operation of the seriograph enables a series of X ray photographs to be taken in a shorter period and with greater accuracy than would be possible by manual operation and greatly widens the field of use of the machine in enabling the characteristics of the circulation of the blood in the vascular system to be visualized and photographed and for similar purposes.

What I claim is:

1. An automatic machine for serial roentgenography comprising in combination with an X ray machine: a housing having a first part adapted to support a subject in position relatively to an X ray machine; a support mounted in said housing part for a stack of cassettes holding unexposed photographic film; means urging said support upwardly so that the top cassette is pressed against the underside of the top of said housing part; a second housing part adjacent the first part and in open communication with said first part toward the top thereof; operating mechanism mounted in said second housing part and having an endless chain mounted for rotation therein; a first projecting member projecting from said chain; parts effective to operate the X ray machine a predetermined number of times and intermittently actuated by said pin, a second member projecting in a direction different to that of the first pin and effective to engage the top cassette after each operation of the X rays and remove it from operative position in the first housing part into storage in the second housing part; and power means effective to drive said endless chain.

2. A machine as set forth in claim 1 and in which said cassettes comprise rectangular frames having an upper backing member held therein, a lower backing member movable away from said upper backing member, and a withdrawal member mounted on the side of the frame positioned toward the second part of the housing and projecting thereinto; the second projecting member carried by said chain and engaging the withdrawal member of the top cassette after each operation of the X ray machine and pulling the top cassette into the second housing part before the next succeeding operation of the X ray machine.

3. A machine as set forth in claim 1 and in which said cassettes comprise rectangular frames having an upper backing member held therein, a lower backing member movable away from said upper backing member, and a withdrawal member mounted on the side of the frame positioned toward the second part of the housing and projecting thereinto; a projecting member carried by said chain and engaging the withdrawal member of the top cassette after each operation of the X ray machine and pulling the top cassette into the second housing part before the next succeeding operation of the X ray machine; guiding means maintaining said cassettes in engagement with the member carried by the chain until the cassette is drawn fully into said second housing part; and automatic means effective to release the cassettes from said guiding means.

4. A machine as set forth in claim 1 and in which said cassettes comprise rectangular frames having an upper backing member held therein, a lower backing member movable away from said upper backing member, and a withdrawal member mounted on the side of the frame positioned toward the second part of the housing and projecting thereinto; and a member carried by said chain and engaging the withdrawal member of the top cassette after each operation of the X ray machine and pulling the top cassette into the second housing part before the next succeeding operation of the X ray machine; a pair of cassette supporting elongated guides pivotally mounted about their longitudinal axes arranged along opposite sides of the second housing part, resilient means normally holding the guides in cassette supporting position, and cam surfaces on said guides positioned to be engaged by the leading edges of the cassettes when drawn fully into the housing second part, engagement of the cassettes with said cam surfaces being effective to rotate the guides about their longitudinal axes to release the cassettes to fall into the lower part of the housing.

5. An automatic machine for serial roentgenography, including: a container housing having an exposure area in the top thereof; a plurality of unexposed X-ray film carrying cassettes in stacked arrangement in said housing beneath the exposure area; a member on each of said cassettes; means for urging said cassettes upwardly in said housing; a second housing for receiving the cassettes after exposure of the film therein; and mechanism for individually and successively transferring said cassettes from the container housing to the receiving housing comprising, an endless chain, a pin on said chain means for mounting said chain for rotation, and a motor for driving said chain in one direction whereby the pin is moved into engagement with the members of the uppermost cassette to withdraw the cassette from the container housing and move it into the receiving housing, and then move it out of engagement with said member to return into engagement with the member of the succeeding casette in the container housing.

6. A machine as embodied in claim 5, wherein an electrical circuit is provided for the motor to supply current thereto; a normally closed switch for said circuit; and means for opening said switch following transfer of all of the cassettes from one housing to the other, comprising a projection on said chain, a star wheel disposed in the path of movement of the projection so as to be turned thereby; a lever for opening said switch; and a pin on the star wheel for actuating the lever to open said switch under rotation of the star wheel.

7. A machine as embodied in claim 6, wherein a brake is provided for the motor normally urged to a braking position; an electroresponsive device for moving the brake to a non-braking position, said device being connected in said circuit in parallel with the motor.

8. A machine as embodied in claim 5, wherein an electrical circuit for an X-ray apparatus is provided, a projection on said chain, an armed wheel disposed in the path of movement of the projection to be rotated thereby, a circular series of pins on the armed wheel, and a switch for the last-mentioned circuit in the path of movement of the series of pins to be opened and closed thereby.

9. A machine as embodied in claim 5, wherein an electrical circuit is provided for the motor to supply current thereto; a normally closed switch for said circuit; and means for opening said switch following transfer of all of the cassettes from one housing to the other, comprising a projection on said chain, a star wheel disposed in the path of movement of the projection so as to be turned thereby; a lever for opening said switch; and a pin on the star wheel for actuating the lever to open said switch under rotation of the star wheel; an electrical circuit for an X-ray apparatus; a projection on said chain, an armed wheel disposed in the path of movement of the projection to be rotated thereby, a circular series of pins on the armed wheel and a switch for the last-mentioned circuit in the path of movement of the series of pins to be opened and closed thereby.

10. A machine for serial roentgenography, including: a housing; cassettes in stacked arrangement in the housing; mechanism for removing the cassettes successively from the housing, comprising an endless chain, a pin on said chain for engagement with a cassette for removing the same from the housing, a driving motor for rotating said chain, a second pin on said chain, an electrical circuit for said motor, a first normally closed switch openable by the second pin to disrupt said circuit, a second electrical circuit for an X-ray apparatus, a second switch for the second circuit, and means operable by the second pin for operating the second switch in timed relation to the removal of the cassettes from the housing.

11. An automatic machine for serial roentgenography including: means for automatically bringing a series of cassettes charged with X-ray sensitive material into position relatively to a subject and an X-ray machine, comprising: an electric driving motor; a member rotatable in a fixed path by said electric motor during a cycle of operation; mechanism actuated by the member and effective to operate the X-ray machine a pre-determined number of times at predetermined intervals and to remove exposed cassettes from operative position between operations of the X-ray machine; a second motor; means for varying the speed of the second motor; a multiswitch element operated by said second motor, the supply leads to the driving motor being controlled successively by said multiswitch element, so that the driving motor is intermittently rotated to obtain a predetermined number of operations of the X-ray machine, the operations being separated by intervals the duration of which is dependent on the speed of the second motor; and manually operated means whereby the circuit of the driving motor may be reestablished and the machine put in condition to repeat its operative cycle.

12. A machine as set forth in claim 11 in which said multiswitch element comprises an elongated switch operating member rotated by the second motor; a plurality of normally open switches mounted adjacent said operating member and controlling the circuit of the first mentioned motor, and a plurality of means mounted on said elongated member and extending in a helical line therearound and effective to close each switch in succession while leaving open the remainder of said plurality of switches.

JESUS M. SANCHEZ-PEREZ.

REFERENCES CITED

The following references are of record in the file of this patent:

UNITED STATES PATENTS

| Number | Name | Date |
|---|---|---|
| 2,107,825 | Humphreys | Feb. 8, 1938 |
| 2,123,528 | Goldfield et al. | July 12, 1938 |